United States Patent [19]

MacDonald

[11] Patent Number: 5,241,665
[45] Date of Patent: Aug. 31, 1993

[54] MEMORY BANK COMPARATOR SYSTEM

[75] Inventor: James R. MacDonald, Austin, Tex.

[73] Assignee: Advanced Micro Devices, Inc., Sunnyvale, Calif.

[21] Appl. No.: 996,500

[22] Filed: Dec. 23, 1992

Related U.S. Application Data

[63] Continuation of Ser. No. 575,957, Aug. 31, 1990, abandoned.

[51] Int. Cl.⁵ .............................................. G06F 12/06
[52] U.S. Cl. .................................. 395/425; 395/400; 364/246.4
[58] Field of Search .............................. 395/400, 425; 365/189.07, 230.03; 364/200 MS File, 900 MS File

[56] References Cited

U.S. PATENT DOCUMENTS

| | | | |
|---|---|---|---|
| Re. 31,318 | 7/1983 | Kaufman et al. | 395/425 |
| 3,803,560 | 4/1974 | DeVoy et al. | 395/575 |
| 3,806,881 | 4/1974 | Miwa et al. | 395/400 |
| 4,234,934 | 11/1980 | Thorsrud | 395/400 |
| 4,254,463 | 3/1981 | Busby et al. | 395/400 |
| 4,507,730 | 3/1985 | Johnson et al. | 395/425 |
| 4,571,676 | 2/1986 | Mantellina et al. | 395/425 |
| 4,592,011 | 5/1986 | Mantellina et al. | 395/425 |
| 4,740,911 | 4/1988 | Shar et al. | 395/425 |
| 4,800,535 | 1/1989 | MacAlpine | 371/51.1 |
| 4,908,789 | 3/1990 | Blokkum et al. | 395/425 |
| 4,980,850 | 12/1990 | Morgan | 395/425 |
| 5,012,408 | 4/1991 | Conroy | 395/425 |
| 5,036,493 | 7/1991 | Nielsen | 365/230.03 |
| 5,040,153 | 8/1991 | Fung et al. | 365/230.03 |
| 5,051,889 | 9/1991 | Fung et al. | 395/425 |
| 5,067,105 | 11/1991 | Borkenhagen et al. | 395/400 |
| 5,119,486 | 7/1992 | Albonesi | 395/425 |
| 5,129,069 | 7/1992 | Helm et al. | 395/400 |
| 5,175,836 | 12/1992 | Morgan | 395/425 |

FOREIGN PATENT DOCUMENTS

| | | |
|---|---|---|
| 0080626 | 11/1982 | European Pat. Off. . |
| 0183231 | 11/1985 | European Pat. Off. . |
| 0226791 | 11/1986 | European Pat. Off. . |
| WO90/04576 | 5/1990 | PCT Int'l Appl. . |

OTHER PUBLICATIONS

IBM Technical Disclosure Bulletin, vol. 32, No. 8A, Jan. 1990, New York, U.S., pp. 452–454, Dynamic Main Storage Address . . . .

Primary Examiner—Joseph L. Dixon
Assistant Examiner—Hiep T. Nguyen
Attorney, Agent, or Firm—Foley & Lardner

[57] ABSTRACT

A memory bank comparator system in a memory system including a plurality of memory banks determines, on a cycle-by-cycle basis, whether a memory address is valid, which one of the memory banks is being addressed, the type of memory bank being addressed, and whether memory bank interleaving is possible. The memory bank comparator system includes a factor assignor which provides a factor for each of the memory banks corresponding to the maximum number of storage locations within each bank, an adder for adding the factors together to provide a sum for each memory bank corresponding to the maximum number of storage locations within its respective memory bank plus the sum of the maximum number of storage locations of the memory banks which precede it, and an address comparator for comparing the memory address to each sum for providing an output indicating which one of the memory banks is being addressed.

8 Claims, 2 Drawing Sheets

MEMORY BANK COMPARATOR SYSTEM

This is a continuation application of application Ser. No. 07/575,957, filed Aug. 31, 1990, abandoned.

BACKGROUND OF THE INVENTION

The present invention generally relates to a memory bank comparator system for use in a memory system incorporating a plurality of memory banks. The present invention more particularly relates to such a system for use in a memory system including a plurality of dynamic random access memory banks and which, determines on a cycle-by-cycle basis if a memory address is a valid address, which memory bank is being addressed, whether memory bank interleaving is possible, and what type of memory access cycle is required.

Memory systems are well known in the art. In applications were a large amount of memory space is required, such as in personal computer applications, memory systems may include more than one memory bank. Also, dynamic random access memories are extremely popular in such applications because of their extremely high memory density.

In a typical system, when a byte of data is to be stored, each memory bank is provided with the same memory address, first a row address, and then a column address. The particular memory location is selected with the application of first, a row address strobe signal and then a column strobe signal being applied to the proper memory bank. A write enable signal is then applied to each memory back which is maintained as the byte of data is conveyed to each bank. Because only one bank is enabled to receive the row and column address, the byte of data is stored within its own unique storage location.

Enhancements have been added to this general memory accessing procedure to improve upon memory access time. For example, a paging mode has been adopted wherein, instead of providing a newly generated row strobe signal during each cycle, the row strobe signal is maintained while new column addresses and column strobe signals are generated. The row strobe signal is maintained until a new row address is detected. This reduces addressing time and has been found to be advantageous since data is normally stored in bytes with a given memory bank being accessed for a number of consecutive cycles.

Another enhancement has been the interleave mode. Interleaving is the practice of storing consecutive bytes of data in alternating or successive memory banks. This practice speeds up memory access because it counters the effect of row address strobe precharge. Hence, while a byte of data is stored in a memory bank, the row address strobe for the previous memory bank may be precharged fully and be ready for the next byte of data to be entered into that memory bank.

In addition to the foregoing, dynamic random access memories have been improved so that such devices are available in different types with each type corresponding to a respective different storage capacity. There are basically three different dynamic random access memory types, a 256 Kb type, a 1 Mb type, and a 4 Mb type. These different memory types afford flexibility to the ultimate user who may wish to tailor the storage size to a particular application or to increase the storage size of an existing system. Unfortunately, each memory type requires a different type of access cycle. This is mainly due to the need for a different number of address bits for each type. For example, the 256 Kb type requires nine row and nine column address bits, the 1 Mb type requires ten row and ten column address bits, and the 4 Mb type requires eleven row and eleven column address bits. Also, memory type is important from the aspect of interleaving, since interleaving is only possible between memory banks of the same type.

Hence, from the foregoing, it can be seen that multiple bank memory systems require memory management. One important aspect of such memory management is to determine which bank is to receive a byte of data. Another important aspect is to determine if interleaving is possible if interleaving is enabled. A still further aspect is to determine the type of memory bank in which the byte of data is to be stored to enable the selection of the proper cycle type. Lastly, it is important to be able to determine if the memory address is a valid address, in other words, if there is an available storage location in one of the memory banks corresponding to the memory address.

One disadvantage in the prior art has been that such systems generally require the interleaving configuration to be determined at the time the system is configured. This places an extreme restriction on the flexibility of the system and does not permit memory bank interchanges after a system is configured. Also, although interleaving cycle type may be determined, such interleaving may not be possible under a given set of circumstances, such as, for example, when a memory bank to be interleaved is full. This can result in the system not knowing where to store a given byte of data.

SUMMARY OF THE INVENTION

The invention therefore provides a memory bank comparator system for use in a memory system of the type including a plurality of memory banks and which is responsive to a memory address for providing a control signal if the memory address is a valid address. The memory bank comparator system includes factor assigning means for providing a factor for each memory bank corresponding to the maximum number of storage locations within the bank, adding means for adding the factors together to provide a total sum corresponding to the total number of storage locations within the system, and comparing means for comparing the memory address to the total sum and for providing the control signal when the memory address is less than the total sum.

The invention further provides a memory bank comparator system for use in a memory system including a plurality of consecutively arranged memory banks and responsive to a memory address associated with a byte of data to be stored. The system includes factor assigning means for providing a factor for each memory bank corresponding to the maximum number of storage locations within each bank, adding means for adding the factors to provide a sum for each memory bank, each sum corresponding to the maximum number of storage locations within its respective memory bank plus the sum of the maximum number of storage locations of the memory banks which precede the respective memory bank, and comparing means for comparing the memory address to each sum for providing an output indicating which ones of the memory banks have available storage locations for the byte of data to be stored. The system further includes configuration means for providing information as to the number of storage locations within each memory bank, and storage cycle logic means responsive to the comparing means and the configuration means for indicating a given one of the memory banks in which the byte of data is to be stored, whether the memory address is present within one of the memory banks, the number of storage locations within the given memory bank, and whether the given memory bank may be interleaved with another one of the memory banks.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements and wherein:

DETAILED DESCRIPTION OF THE PREFERRED EMBODIMENT

Figure 1:
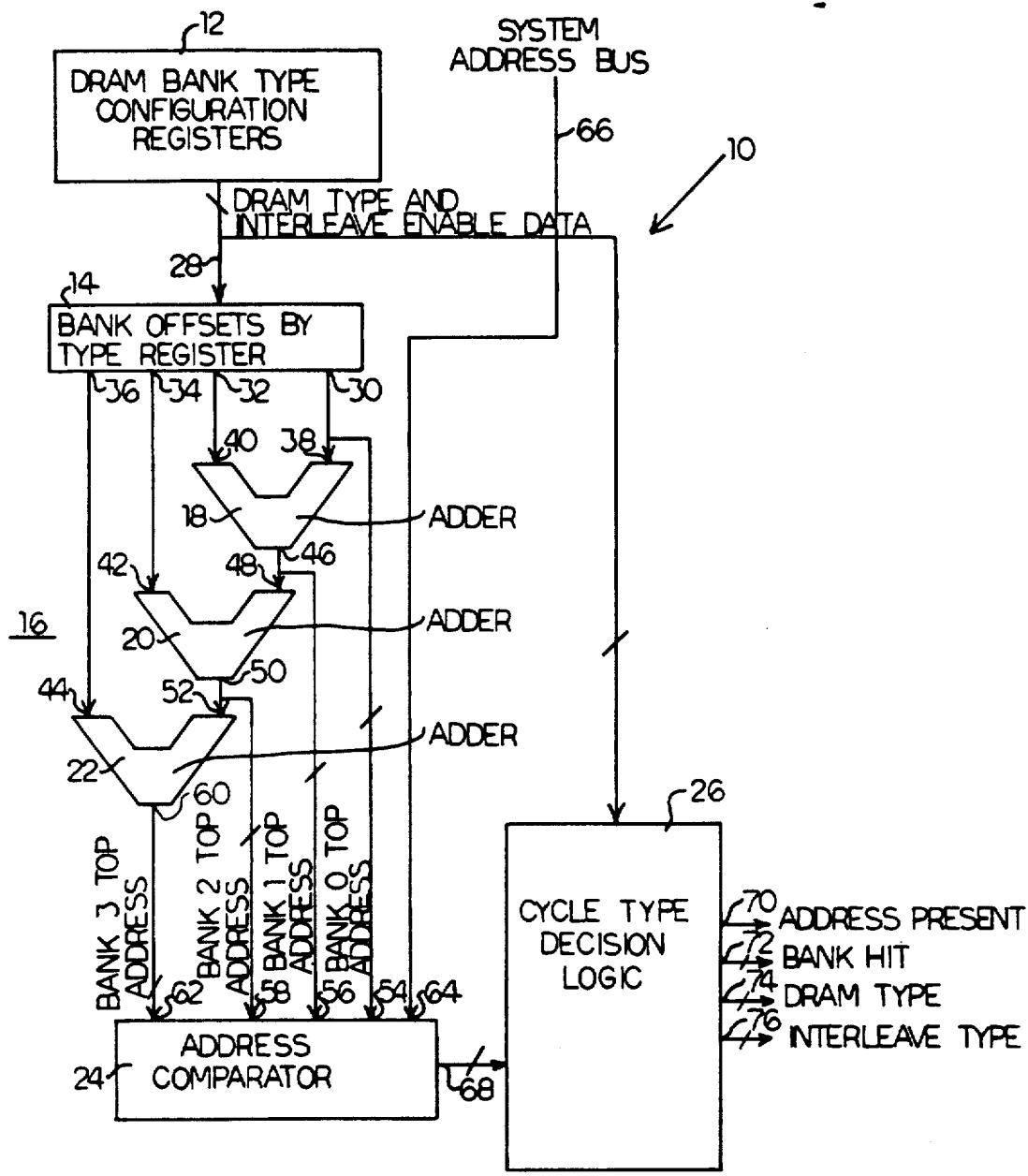
FIG. 1 is a block diagram of a memory bank comparator system embodying the present invention.

Referring now to FIG. 1, it illustrates a memory bank comparator system 10 embodying the present invention. The memory bank comparator system 10, in accordance with this preferred embodiment, is adapted for use with a memory system including four dynamic random access memory banks and wherein memory addresses are provided in a manner so that each memory address indicates the number of memory storage locations previously accessed.

The memory bank comparator system 10 generally includes a DRAM bank-type configuration register 12, a bank offsets by type register 14, an adder 16, an address comparator 24, and a cycle-type decision logic 26. The adder 16 includes adders 18, 20 and 22.

The configuration register 12 is arranged to store two bits of data for each of the four memory banks which indicate a particular type of DRAM memory bank used in the memory banks. As previously mentioned, the DRAM memory banks may be a 256 Kb type, a 1 Mb type, or a 4 Mb type. The configuration register 12 conveys the eight configuration bits over an 8-bit parallel bus 28 to the bank offsets by type register 14. The register 14 includes outputs 30, 32, 34 and 36. It assigns a factor for each of the memory bank types, wherein each factor corresponds to the maximum number of storage locations within each of the memory bank types. More specifically, the register 14 provides at its outputs 30, 32, 34 and 36 a 5-bit indication as to the maximum number of storage locations within the first, second, third and fourth memory banks respectively. The 5-bits provided at the outputs 30, 32, 34 and 36 are the most significant five bits representing the maximum number of storage locations within each of the memory banks.

The adder 16 adds the factors provided by the register 14 to provide a total sum and a partial o intermediate sum for each memory bank. The total sum corresponds to the total number of storage locations within the memory system memory banks. The partial or intermediate sum for each of the memory banks corresponds to the maximum number of storage locations within each respective memory bank plus the sum of the maximum number of storage locations of the memory banks which precede the respective memory bank. To that end, output 30 of register 14 is coupled to an input 38 of adder 18, output 32 is coupled to an input 40 of adder 18, output 34 is coupled to an input 42 of adder 20, and output 36 is coupled to an input 44 of adder 22. The output 46 of adder 18 is coupled to the input 48 of adder 20 and output 50 of adder 20 is coupled to input 52 of adder 22. Lastly, the output 30 of register 14 is also coupled to an input 54 of address comparator 24, the output 46 of adder 18 is coupled to an input 56 of address comparator 24, the output 50 of adder 20 is coupled to an input 58 of address comparator 24, and the output 60 of adder 22 is coupled to an input 62 of address comparator 24. Hence, the inputs 54, 56 and 58 of address comparator 24 are provided with the aforementioned partial or intermediate sums corresponding to the first memory bank, second memory bank, and third memory bank and input 62 is provided with the total sum corresponding to the fourth memory bank respectively.

The address comparator 24 includes a further input 64 which is coupled to the system address bus 66. The address comparator 24 at input 64 thus receives a memory address, for each memory access cycle over the system address bus 66. As previously mentioned, the memory addresses are assigned so that each memory address is indicative of the total number of memory storage locations previously utilized within the memory system. The address comparator 24 compares the memory address received over bus 66 to each of the sums at its inputs 54, 56, 58 and 62 for providing at a 4-bit output 68 intermediate control signals indicating which ones of the memory banks have available storage locations for the byte of data to be stored. In accordance with this preferred embodiment, the sums at inputs 56, 58 and 62 are represented by six bits. The cycle type decision logic 26 is responsive to the address comparator 24 and the configuration register 12 for indicating at a single bit output 70 whether the memory address is valid, at a 4-bit output 72 which memory bank is being addressed, at a 3-bit output 74 what type of dynamic random access memory is being addressed, and a 3-bit output 76 if memory bank interleaving is possible and, if so, the type interleaving which is possible.

Figure 2:
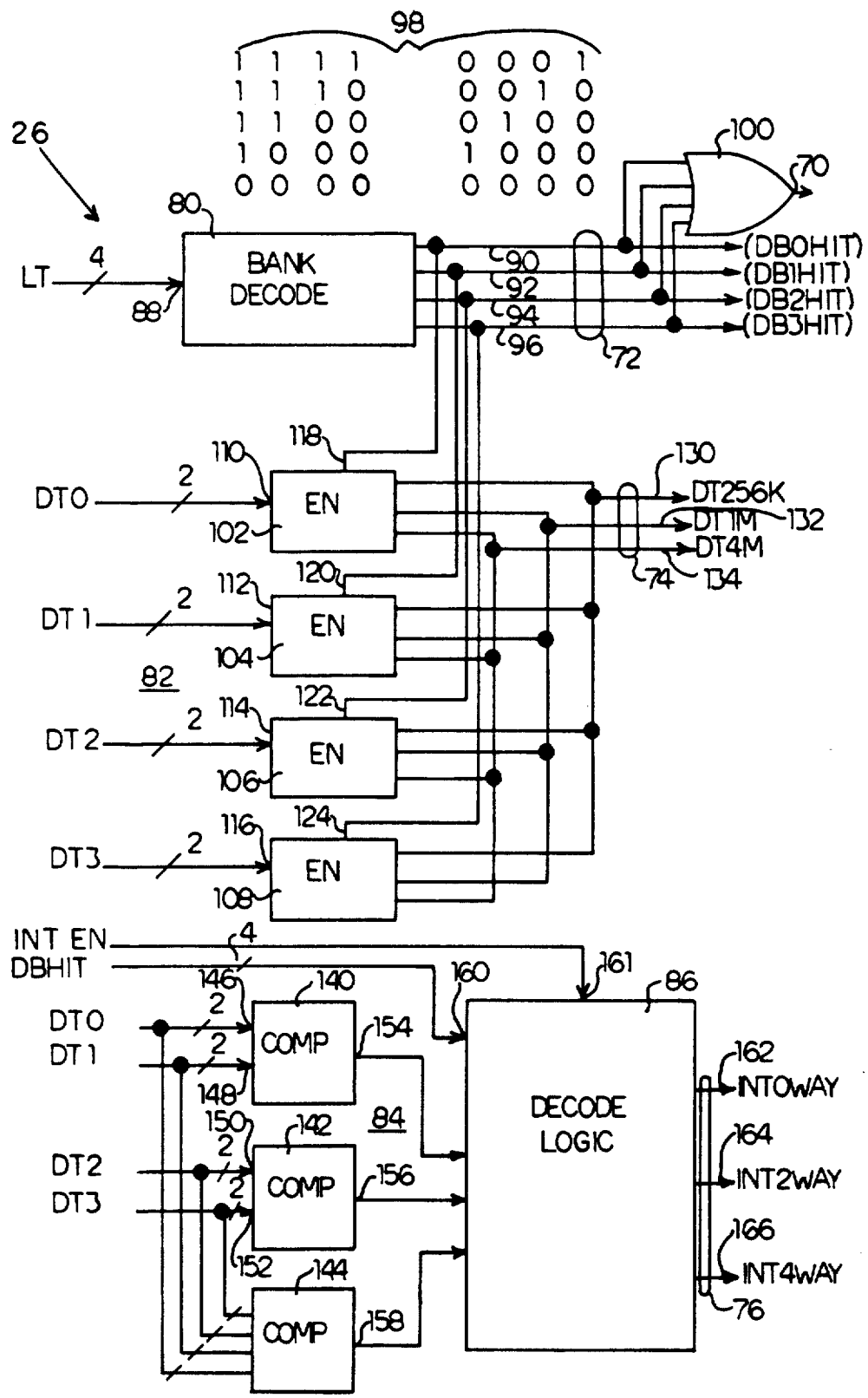
FIG. 2 is a detailed block diagram of the cycle type decision logic of FIG. 1.

Referring now to FIG. 2, it illustrates in greater detail the cycle type decision logic 26 of FIG. 1. The cycle type decision logic 26 generally includes a memory bank decoder 80, a memory bank type decoder 82, a memory bank type comparator 84, and decode logic 86.

The bank decoder 80 includes a 4-bit input 88 which is coupled to the 4-bit output 68 of the address comparator 24. The four bits at input 88 are the intermediate control signals which represent the individual memory banks which have available storage locations for the bit of data to be stored. The bank decoder further includes four output lines 90, 92, 94 and 96 which form the output 72 of the cycle type decision logic 26. The truth table for the bank decoder 80 is indicated in the Figure by reference numeral 98. As indicated by the truth table 98, if all four bits of the address comparator are logical ones, line 90 will have a logical one. If the first bit is zero and the last three are ones, line 92 will have a logical one. If the first two bits are zeros and the last two bits are ones, line 94 will have a logical one, and if the first three bits are zeros and the fourth bit is a one, line 96 will have a logical one. If all four bits of the address comparator are zeros, none of the lines 90, 92, 94 and 96 will have a logical one. As a result, if the memory address is less than the first sum at input 54 of address comparator 24, the logical one on line 90 will indicate that the first memory bank is being addressed. If the memory address is less than the sum at input 56 but greater than the sum at input 54, the logical one on line 92 will indicate that the second memory bank is being addressed. If the memory address is less than the sum at input 58 but greater than the sum at input 56, the logical one on line 94 will indicate that the third memory bank is being addressed. If the memory address is less than the sum at input 62, but greater than the sum at input 58, the logical one on line 96 will indicate that the fourth memory bank is being addressed. Lastly, if the memory address is greater than the total sum at input 62, then the lack of a logical one on any of the lines, 90, 92, 94 and 96 will indicate that the address is an invalid address.

An exclusive OR gate 100 includes four inputs with each input being coupled to a respective given one of the lines 90, 92, 94 and 96. If any one of the lines 90, 92, 94 and 96 has a logical one, the exclusive OR gate 100 will provide at its output 70, which is the output 70 of the cycle type decision logic 26, a logical one indicating that the memory address is a valid address and that there is an available storage location within the memory system for the bit of data to be stored.

The memory bank type decoder 82 determines the type of memory bank in which the data bit is to be stored. The memory bank type decoder 82 includes selectors 102, 104, 106 and 108. Each of the selectors includes a 2-bit input, selector 102 having input 110, selector 104 having input 112, selector 106 having input 114 and selector 108 having input 116. The inputs 110, 112, 114 and 116 are coupled to the configuration register 12 with each input receiving a 2-bit indication as to the type of dynamic random access memory employed within its respective memory bank. The selectors 102, 104, 106 and 108 further each include an enable input 118, 120, 122 and 124 respectively, which are coupled to the lines 90, 92, 94 and 96 respectively.

Each of the selectors 102, 104, 106 and 108 also includes three outputs with each output corresponding to a respective different one of the dynamic random access memory types. The corresponding outputs are coupled together to form the DRAM type output 74 of the cycle type decision logic 26. The output 74 includes a first output line 130 corresponding the 256 Kb memory type, output line 132 corresponding to the 1 Mb memory type, and output 134 corresponding to the 4 Mb memory type. When one of the output lines 90, 92, 94 and 96 of the bank decoder 80 is a logical one, its corresponding selector 102, 104, 106 and 108 will be enabled. The enabled selector, in response to the 2-bit memory type input, will provide a logical one at its output corresponding to the memory type indicated by the 2-bit input. For example, if output line 92 is high, indicating that the second memory bank is being addressed, selector 104 is enabled. If the 2-bit input 112 has a 2-bit input from the configuration register indicating that the second memory bank is a 1 Mb memory type, it will provide a logical one to output line 132 to thereby indicate that the addressed memory bank is a 1 Mb memory type. This information can then be utilized to select the proper access cycle type for the 1 Mb memory within the second memory bank.

The memory bank type comparator 84 includes comparators 140, 142 and 144. Each of the comparators is coupled to the configuration register for receiving the 2-bit indication as to the type of memory which is employed in the respective memory banks. To that end comparator 140 includes a 2-bit input 146 for receiving the 2-bit indication as to the type of memory in the first memory bank and a second 2-bit input 148 for receiving the 2-bit indication as to which type of memory is in the second memory bank. Similarly, comparator 142 includes a first 2-bit input 150 for receiving the 2-bit indication as to the type of memory within the third memory bank and a second 2-bit input 152 for receiving the 2-bit indication of the type of memory within the fourth memory bank. Comparator 144 includes four 2-bit inputs for receiving the 2-bit indications as to the type of memory within the first, second, third and fourth memory banks.

As can be seen from the above, comparator 140 is arranged to determine if the first and second memory banks are of the same type, comparator 142 is arranged to determine if the third and fourth memory banks are of the same type, and comparator 144 is arranged to determine if all four of the memory banks are of the same type. If the first and second memory banks are of the same type, comparator 140 will provide at an output 154 a logical one, if the third and fourth memory banks are of the same type, comparator 142 will provide at an output 156 a logical one, and if all four memory banks are of the same type, comparator 144 will provide at an output 158 a logical one. The outputs 154, 156 and 158 of comparators 140, 142 and 144 respectively are coupled to the decode logic 86. The decode logic 86 is also coupled to the output lines 90, 92, 94 and 96 of the bank decoder 80 at a 4-bit input 160 and to an interleave enable at an input 161.

The decode logic further includes the output 76 of the cycle type decision logic 26 which includes output lines 162, 164 and 166. If two-way interleaving is possible, the decode logic will provide a logical one on output line 164. This indicates that either the first and second memory banks may be interleaved or the third and fourth memory banks may be interleaved. If the decode logic provides a logical one at output 166, this will indicate that all four memory banks may be interleaved. If the decode logic provides a logical one at output line 162, this will indicate that none of the memory banks may be interleaved. As previously mentioned, memory banks may only be interleaved if they include memories of the same type. In addition, in accordance with this preferred embodiment, only the first and second memory banks may be interleaved, the third and fourth banks may be interleaved, or all four memory banks may be interleaved together.

If interleaving is not enabled by the system configuration, the decode logic will receive a logical zero at its input 161 and provide a logical one at its output 162. If interleaving is enabled, the decode logic in response to the memory bank type comparator 84 will determine whether 2-way or 4-way interleaving is possible. For example, if output line 90 of the bank decoder is at a logical one indicating that the first memory bank is being addressed, and if comparator 140 determines that the first and second memory banks are of the same type, the decode logic will then provide a logical one at output 164 indicating that 2-way interleaving is possible. If, in this case, comparator 144 determines that all four of the memory banks include memories of the same type, it will provide a logical one at output 166 indicating that 4-way interleaving is possible.

Hence, from the foregoing, it can be seen that the present invention provides a memory bank comparator system which operates on a cycle by cycle basis to determine if a memory address is a valid address, which memory bank is being addressed, what type of memory bank is being addressed, and whether interleaving is possible. Because the memory bank comparator system of the present invention generates the sums for each of the memory banks, it can make such determinations on a cycle-by-cycle basis. As a result, interleaving cycle type need not be set when the system is configured, and the memory system may be operated even with empty memory banks. In addition, the memory bank comparator system of the present invention assigns the addresses in a linear manner with the lower addresses being assigned to the lower number banks.

While a particular embodiment of the present invention has been shown and described, modifications may be made, and it is therefore intended to cover in the appended claims all such changes and modifications which fall within the true spirit and scope of the invention.

What is claimed is:

1. A memory bank comparator system for use in a memory system including a plurality of consecutively ordered memory banks, each said memory bank having a given storage capacity, said memory bank comparator system being responsive to a memory access address and comprising:

configuration means for providing configuration data representative of the storage capacity of each of said memory banks;

means responsive to said configuration data for providing a plurality of cumulative storage capacity signals, wherein each of said cumulative storage capacity signals corresponds to one of said memory banks and comprises data representative of the total storage capacity of its corresponding one of said memory banks and the storage capacities of the preceding ordered memory banks;

comparing means for comparing said memory access address to said cumulative storage capacities for providing a set of intermediate control signals;

first decoder means having an output and being responsive to said set of intermediate control signals for providing a selected bank signal at said output, wherein the selected bank signal indicates the memory bank being accessed by said memory access address;

second decoder means having a second output and being responsive to said selected bank signal and said configuration data, for providing at said second output a selected bank capacity control signal indicative of the storage capacity of the memory bank being accessed by said memory access address;

a memory bank storage capacity comparing means responsive to said configuration data, for determining if two or more of said memory banks have the same storage capacity; and a third decoding means, responsive to said selected bank signal and said memory bank storage capacity comparing means, for generating an interleave control signal representative of the interleave factor for the memory bank being accessed by said memory access address.

2. The system of claim 1 further comprising means, responsive to said selected bank signal, for generating a validity signal indicative of whether any one of said memory banks is accessed by said memory access address.

3. The system of claim 1 wherein said memory banks include first, second, third and fourth memory banks, and wherein said memory bank storage capacity comparing means determines if said first and second memory banks have the same storage capacity, if said third and fourth memory banks have the same storage capacity, and if said first, second, third and fourth memory banks have the same storage capacity.

4. The system of claim 1 wherein the selected bank signal comprises a plurality of enable signals, each one of said plurality of enable signals corresponding to one of said memory banks, wherein said first decoder means enables the one of said plurality of enable signals which corresponds to the memory bank being accessed by said access address.

5. The system of claim 4 wherein said second decoder means includes a plurality of selectors, wherein each of said plurality of selectors has a signal input, a signal output, and an enable input and corresponds to one of said memory banks, wherein each of said selectors receives the configuration data representative of the capacity of its respective memory bank at its signal input, and generates the configuration data representative of the capacity of its respective memory bank at its signal output when an enable signal is applied to its enable input.

6. The system of claim 5 wherein each one of said plurality of enable signals is applied to the enable input of the one of said plurality of selectors which corresponds to its respective memory bank.

7. The system of claim 1 wherein said intermediate control signals include a plurality of bits, wherein each of said plurality of bits corresponds to one of said memory banks, wherein the bit of said plurality of bits which corresponds to a given one of said memory banks is enabled if the access address is equal to or less than the highest address of said given one of said memory banks.

8. A memory bank comparator system for use in a memory system including a plurality of consecutively ordered memory banks, each said memory bank having a given storage capacity, said memory bank comparator system being responsive to a memory access address and comprising:

a plurality of configuration registers, wherein each one of said plurality of configuration registers corresponds to one of said memory banks and contains configuration data indicative of the storage capacity of its corresponding one of said memory banks;

adding means, coupled to said plurality of configuration registers, for generating a plurality of cumulative storage capacity signals responsive to the configuration data contained in said plurality of configuration registers, wherein each of said cumulative storage capacity signals corresponds to one of said memory banks and comprises data representative of the total storage capacity of its corresponding one of said memory banks and the storage capacities of the preceding ordered memory banks;

an address comparator disposed to receive said plurality of cumulative storage capacity signals and said access address and generate in response thereto a plurality of intermediate control signals;

a bank decoder having a plurality of outputs, wherein each of said plurality of outputs corresponds to one of said memory banks, said bank decoder being disposed to receive said plurality of intermediate control signals and generate, in response thereto, an enable signal at the output of said plurality of outputs which corresponds to the memory bank being accessed by the access address;

a plurality of selectors, wherein each of said plurality of selectors has a signal input, an enable input, and a signal output, wherein the signal input of each of said plurality of selectors is coupled to one of said plurality of configuration registers, wherein the enable input of each of said plurality of selectors is coupled to one of said plurality of outputs of said bank decoder, whereby upon the generation of an enable signal by said bank decoder at one of said outputs, the selector coupled to the enabled bank decoder output generates at its signal output a signal indicative of the storage capacity of the memory bank being accessed by the access address;

a capacity comparing means coupled to said configuration registers, said capacity comparing means being responsive to said configuration data, for determining if two or more of said memory banks have the same storage capacity; and decode logic coupled to said capacity comparing means and the outputs of said bank decoder, said decode logic being responsive to the enable signals generated at said outputs of said bank decoder and said memory bank storage capacity comparing means, for generating an interleave control signal representative of an interleave factor for the memory bank being accessed by said memory access address.

* * * * *